Oct. 21, 1952 H. C. ZIEMKE 2,614,878
FINGER HOOK
Filed July 20, 1949

Herbert C. Ziemke
INVENTOR.

Patented Oct. 21, 1952

2,614,878

UNITED STATES PATENT OFFICE 2,614,878

FINGER HOOK

Herbert C. Ziemke, Racine, Wis.

Application July 20, 1949, Serial No. 105,736

1 Claim. (Cl. 294—16)

This invention comprises novel and useful improvements in meat hooks, and more specifically pertains to improved handling means in said meat hooks especially adapted for use in packing houses, butcher shops, and other similar places, besides various household uses.

The primary object of my invention is the provision of a hand tool or implement for handling pieces of meat or similar articles where it is necessary, when cutting the meat or similar materials, to rigidly hold the meat very closely to the cutting line. Here, there is an ever-present danger of injury to the fingers used in holding the meat. By using this new and novel finger hook the fingers are kept out of the danger zone and at the same time the operator is able to hold the meat securely in the most advantageous points while cutting the meat.

A further important feature of the invention resides in providing a meat hook which does not interfere with the normal use of the hand and at the same time is available when needed. These, together with various ancillary objects and features of this invention, to be more specifically enumerated herein, are attained by the present device which is illustrated by way of example only in the accompanying drawings, wherein.

Figure 1:
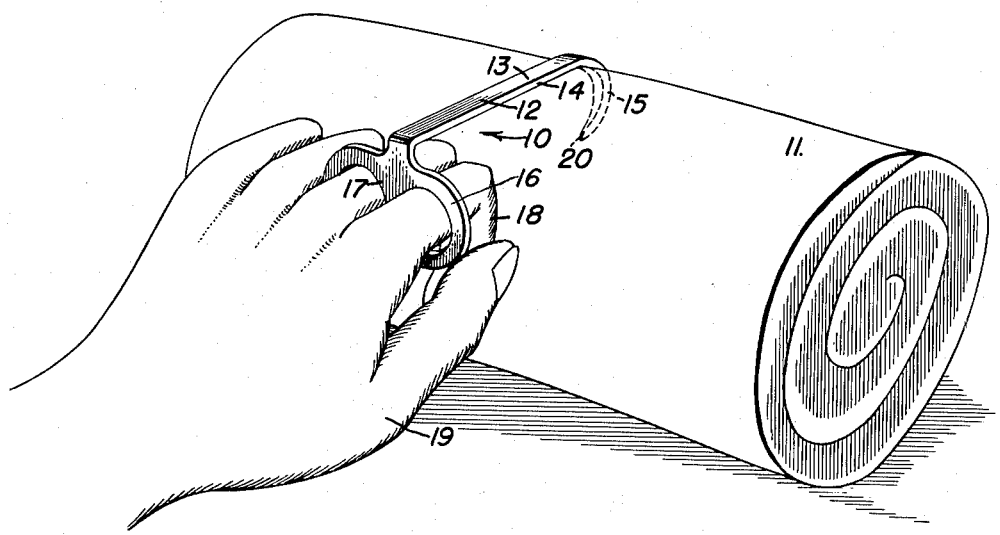
Figure 1 is a perspective view of a meat hook or finger implement of the type embodying my invention.

Referring now more specifically to the accompanying drawings wherein like numerals designate similar parts throughout the various views, reference is made chiefly to Figure 1 wherein 10 designates the preferred embodiment of the present invention. This finger hook 10 is used to rigidly hold a cut of meat 11, or a similar article, when it is necessary to cut or similarly handle such article. This finger hook consists of a shank portion 12 of rectangular cross-section with a greater width 13 than height 14, and which shank portion is substantially straight throughout the greater portion of its length. The shank portion 12 gradually tapers in width to a pointed tip 20. This tapered portion is bent downwardly in an arcuate manner so as to form the hook portion 15. The other end of shank portion 12 is bent downwardly at substantially right angles to form a handle portion 16. This handle portion 16 has a plurality of apertures 17 through which fingers 18 of hand 19 may be placed so as to securely engage the finger hook 10.

Figure 2:
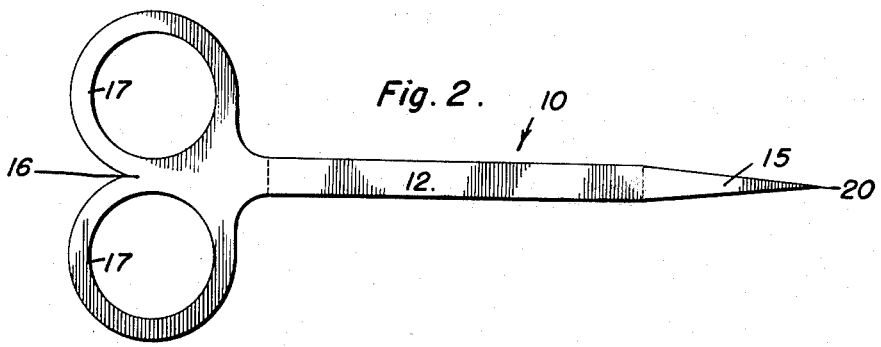
Figure 2 is a top plan view of a steel stamping from whence is formed the present device.
Figure 3:
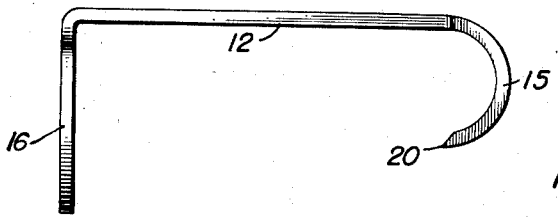
Figure 3 is a side elevational view of the present device.

Referring now more specifically to Figure 2, herein is shown a steel stamping of the present device before the hook portion 15 and the handle portion 16 are bent. In the preferred embodiment of my invention, it is to be noted that two apertures 17 are used. Two or more of these apertures are necessary to securely maintain this device on the hand when in use. However, when this tool is on the fingers, it does not interfere with the normal use of the hand and is, at the same time, available for use when needed. Thus, this device may be maintained on the fingers of the hand while the operator is engaged in other tasks, and when necessary to use the device, he has the device readily available. Clearly, this is a valuable improvement over the Patent 1,542,503 on a Meat Hook, which discloses no such features.

Since it is thought that the manner of operating and constructing the invention will be readily understood from the foregoing specification, taken in conjunction with the accompanying drawings, further explanation is believed to be unnecessary.

However, since numerous modifications and equivalents will readily occur to those skilled in the art after a study of the principles of the invention as set forth hereinbefore, it is not desired to limit the invention to the exact structure illustrated, and accordingly, numerous modifications and variations may be resorted to, falling within the scope of the appended claim.

Having described the invention, what is claimed as new is:

A finger hook formed from a single sheet of metal and including a flat shank of substantial width, a downwardly and rearwardly curved, tapered hook terminating in a point on one end of the shank, and a transversely elongated plate-like handle depending from the other end of said shank at right angles thereto, said handle having a plurality of transversely aligned finger receiving openings therein.

HERBERT C. ZIEMKE.

REFERENCES CITED

The following references are of record in the file of this patent:

UNITED STATES PATENTS

| Number | Name | Date |
| --- | --- | --- |
| D. 44,391 | Weder et al. | July 22, 1913 |
| D. 53,649 | Weder et al. | July 22, 1919 |
| 334,486 | Strong et al. | Jan. 19, 1886 |
| 384,635 | Maynard | June 19, 1888 |
| 1,111,370 | Faix et al. | Sept. 22, 1914 |
| 1,184,710 | Bauman | May 30, 1916 |
| 1,203,600 | French | Nov. 7, 1916 |
| 1,398,919 | Schwarting | Nov. 29, 1921 |
| 1,482,056 | Watkins | Jan. 29, 1924 |
| 2,482,314 | Beckwell | Sept. 20, 1949 |

OTHER REFERENCES

Scanlon Morris Catalog: "Stainless Steel Retractors," pp. 1 to 4 (copy in Div. 55), 128-20.